No. 894,745. PATENTED JULY 28, 1908.
C. J. PIHL.
LUBRICATING DEVICE.
APPLICATION FILED OCT. 24, 1906.

Witnesses:
Ludger A. Nicol.
Florence A. Parr.

Inventor:
Carl J. Pihl
by Gardner W. Pearson
Attorney.

UNITED STATES PATENT OFFICE.

CARL J. PIHL, OF LOWELL, MASSACHUSETTS, ASSIGNOR TO GARDNER W. PEARSON, OF LOWELL, MASSACHUSETTS.

LUBRICATING DEVICE.

No. 894,745.  Specification of Letters Patent.  Patented July 28, 1908.

Application filed October 24, 1906. Serial No. 340,366.

*To all whom it may concern:*

Be it known that I, CARL J. PIHL, a citizen of the United States, residing at Lowell, in the county of Middlesex and State of Massachusetts, have invented certain new and useful Improvements in Lubricating Devices, of which the following is a specification.

My invention relates to lubricating devices for the bearings of vertical shafting. It is especially adaptable for the bearings of high speed machines, such as centrifugal separators, candy machines, etc. Its principal objects are to provide a simple and compact device which will keep the bearing and shaft well lubricated at all times.

My device is illustrated in the accompanying drawings, in which

Figure 1:
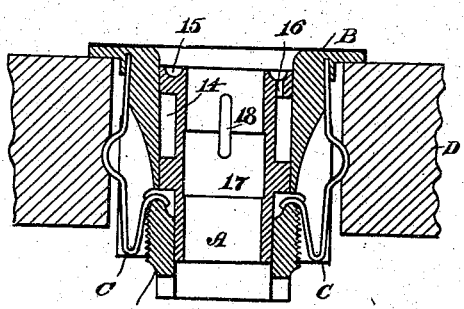
Figure 2:
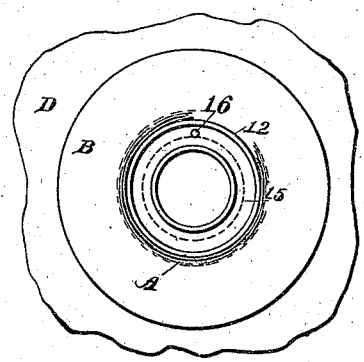
Figures 3, 4:
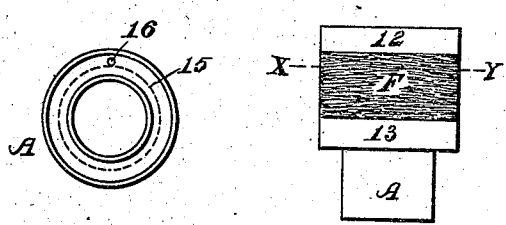
Figure 5:
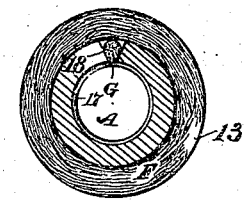
Figure 6:
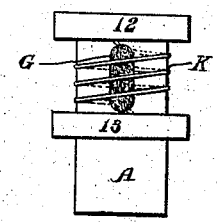

Figure 1 is a sectional view of a bearing, in which my device is applied but with the absorbent material left out. Fig. 2 is a top view of Fig. 1. Fig. 3 is a top view of the removable inside bearing. Fig. 4 is a view of the inside bearing detached also showing the absorbent material. Fig 5 is an enlarged sectional view on line X Y of Fig. 4. Fig. 6 is a similar view to Fig. 4 but with a wire in place of the absorbent material.

A is the inside bearing, of brass or other suitable bearing material bored of a size to make a running fit with the shaft which is to be supported.

B is the outer shell, within which the inside bearing fits closely.

C C are springs which render the bearing elastic and E is a check nut which holds the springs in place.

D is the casing which supports the outer shell B.

The inside bearing A is of cylindrical form and is provided with flanges 12 and 13 which are of such diameter as to fit snugly, within the orifice in the outer shell B. This orifice, preferably, tapers slightly from top to bottom and flange 12 is slightly larger than flange 13 and both correspond with the tapering orifice in outer shell B. These flanges 12 and 13 leave between them an annular recess 14, in which I may place absorbent material F, preferably wicking or other rope like material capable of being wound therein.

The top surface of bearing A and flange 12 is recessed to form the annular channel 15 which receives the oil and retains any excess. An oil hole 16 connects channel 15 with recess 14. Inside bearing A is preferably channeled on its inside surface to form the annular groove 17 which serves to prevent the shaft from rattling and helps to distribute the oil. A slot 18 connects the annular recess 14 with the inside surface of bearing A, whereby the lubricating oil may pass from recess 14 onto the shaft. This slot 18 is narrower on the inside than on the outside to permit the elastic absorbent material G to be pressed into it but not through it. I prefer to use in this slot 18 a strip of elastic felt G and I force this into the slot and then hold it in place by means of the wicking F. This construction insures a steady supply of oil to the shaft and when the absorbent material F or G wears out, it is very easy to knock out the inside bearing A and replace the absorbent material. The wicking F serves as a reservoir for the oil and the felt G serves as a feeder or elastic brush. A greater or less amount of wicking may be used or it may be omitted entirely.

Fig. 6 shows a modification wherein the absorbent material F is dispensed with entirely and elastic material G is held in place by a wire K wound around inside bearing A, between its flanges. In this case, the space 14 itself serves as a reservoir and the oil is fed to the shaft through slot 18 and by the capillary attraction of elastic brush G.

What I claim as my invention and desire to cover by Letters Patent is;—

1. In a lubricating device, an outer shell, formed with a tapering orifice, an inner bearing provided with two external flanges fitted inside said tapering orifice and comprising an annular channel in the top and an oil hole through the upper flange as well as a radial slot, combined with absorbent material between the flanges.

2. In a lubricating device, an outer shell, an inner bearing provided with two external flanges fitted inside the outer shell and comprising an oil hole through the top flange and a tapering radial slot through the inner bearing between the flanges, combined with elastic absorbent material in the radial slot, and absorbent material wound between the flanges as described.

In testimony whereof I affix my signature in presence of two witnesses.

CARL J. PIHL.

Witnesses:
FISHER H. PEARSON,
FLORENCE A. PARR.